Sept. 18, 1951 C. C. LOOMIS ET AL 2,568,198

MECHANISM TO CONVERT A FIREARM FROM SEMIAUTOMATIC TO FULL AUTOMATIC ACTION

Filed Aug. 27, 1947 7 Sheets-Sheet 1

INVENTORS
CRAWFORD C. LOOMIS
KENNETH J. LOWE DECEASED
BY BY JANE A. LOWE ADMRX.
John H. Lewis Jr.
ATTORNEY Sept. 18, 1951 C. C. LOOMIS ET AL 2,568,198

MECHANISM TO CONVERT A FIREARM FROM SEMIAUTOMATIC TO FULL AUTOMATIC ACTION

Filed Aug. 27, 1947 7 Sheets-Sheet 2

INVENTORS
CRAWFORD C. LOOMIS
KENNETH J. LOWE DECEASED
BY JANE A. LOWE ADMRX.

BY John H. Lewis Jr.
ATTORNEY

INVENTORS
CRAWFORD C. LOOMIS
KENNETH J. LOWE DECEASED
BY BY JANE A. LOWE ADMRX.
John H. Lewis Jr.
ATTORNEY Sept. 18, 1951 C. C. LOOMIS ET AL 2,568,198

MECHANISM TO CONVERT A FIREARM FROM SEMIAUTOMATIC TO FULL AUTOMATIC ACTION

Filed Aug. 27, 1947 7 Sheets-Sheet 4

INVENTORS
CRAWFORD C. LOOMIS
KENNETH J. LOWE DECEASED
BY BY JANE A. LOWE ADMRX.
John H. Lewis Jr.
ATTORNEY Sept. 18, 1951 C. C. LOOMIS ET AL 2,568,198

MECHANISM TO CONVERT A FIREARM FROM SEMIAUTOMATIC TO FULL AUTOMATIC ACTION

Filed Aug. 27, 1947 7 Sheets-Sheet 5

INVENTORS
CRAWFORD C. LOOMIS
KENNETH J. LOWE DECEASED
BY BY JANE A. LOWE ADMRX.
John H. Lewis Jr.
ATTORNEY Sept. 18, 1951 C. C. LOOMIS ET AL 2,568,198
MECHANISM TO CONVERT A FIREARM FROM SEMIAUTOMATIC TO FULL AUTOMATIC ACTION
Filed Aug. 27, 1947 7 Sheets-Sheet 6
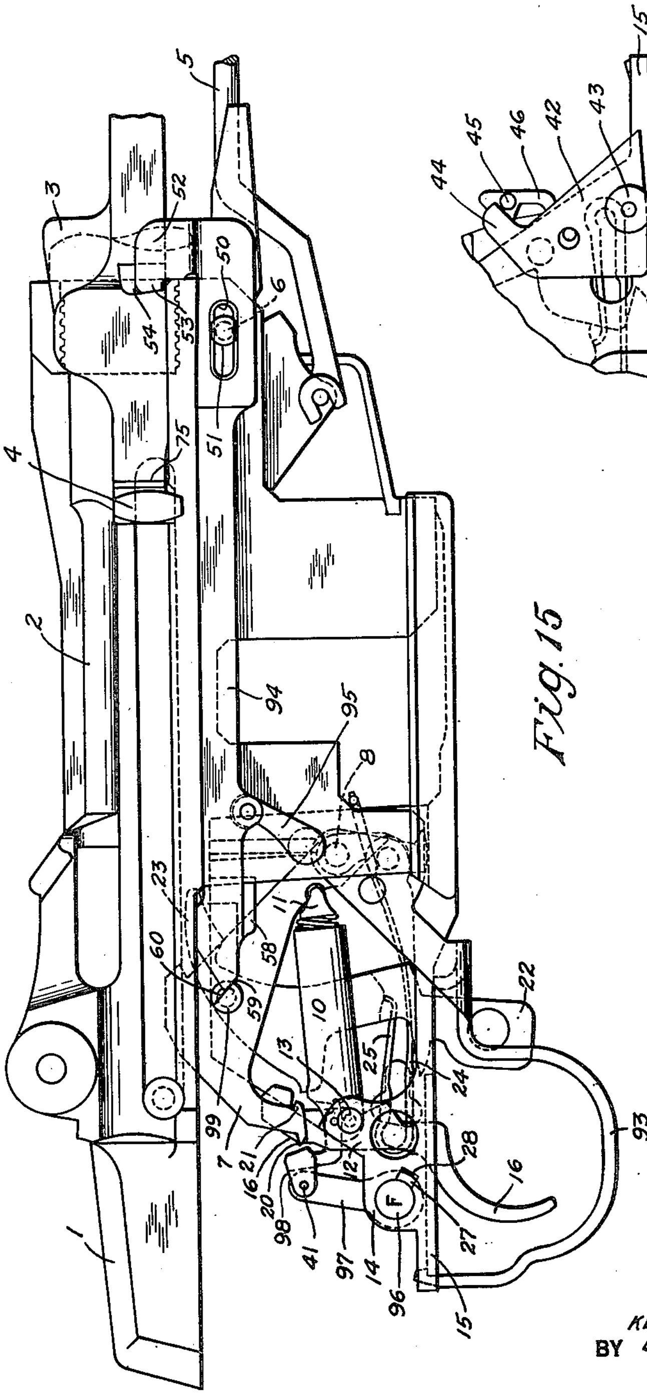
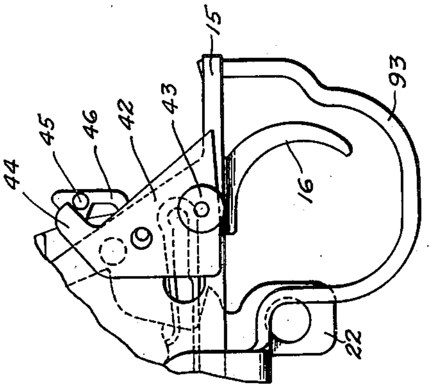
Fig. 17
INVENTORS
CRAWFORD C. LOOMIS
KENNETH J. LOWE DECEASED.
BY BY JANE A. LOWE ADMRX.
John H. Lewis Jr.
ATTORNEY

MECHANISM TO CONVERT A FIREARM FROM SEMIAUTOMATIC TO FULL AUTOMATIC ACTION

Filed Aug. 27, 1947 7 Sheets-Sheet 7

INVENTORS
CRAWFORD C. LOOMIS
KENNETH J. LOWE DECEASED
BY BY JANE A. LOWE ADMRX.
John H. Lewis Jr.
ATTORNEY Patented Sept. 18, 1951

2,568,198

UNITED STATES PATENT OFFICE 2,568,198

MECHANISM TO CONVERT A FIREARM FROM SEMIAUTOMATIC TO FULL AUTOMATIC ACTION

Crawford C. Loomis, Ilion, N. Y., and Kenneth J. Lowe, deceased, late of Ilion, N. Y., by Jane A. Lowe, administratrix, Ilion, N. Y., assignors to Remington Arms Company, Inc., Bridgeport, Conn., a corporation of Delaware Application August 27, 1947, Serial No. 770,879

23 Claims. (Cl. 89—140)

This invention relates to a firearm of the military automatic reloading type which may be selectively conditioned for the delivery of either single shots or a plurality of shots upon each actuation of the trigger.

In coordinating the problems of ordnance manufacture, logistics, and military training for the complex organization of the modern military machine, it is of great importance that there be maintained a maximum degree of interchangeability and similarity in regard to weapons, operating principles of such weapons, components thereof, and ammunition therefor. In connection with ordnance manufacture, the advantages of being able to produce identical components for several weapons are too obvious to warrant further discussion. It is equally obvious that this same consideration is of prime importance in connection with the supply of spare parts and field maintenance of the weapons. It is standard practice to train soldiers to function effectively with any weapon with which they may come in contact and similarity in functioning is of great assistance in such training.

The standard combat rifle of the armed forces of the United States is the U. S. rifle caliber .30 M-1, described generally in U. S. Patent No. 2,377,338 to John C. Garand. This rifle is of the gas operated automatically reloading type and is so constructed that only one shot may be fired for each actuation of the trigger. Under the rapidly changing conditions of modern warfare, it is at times essential that the normal firepower of a unit be greatly augmented. In the past an attempt has been made to meet this need by the use of light machine guns and by the provision of one or more Browning automatic rifles per unit.

It is an object of this invention to provide an arm having the desirable characteristics of the U. S. rifle M-1 but capable of being conditioned to deliver a volume of fire equivalent to that of a Browning automatic or similar weapon. It is contemplated that this object can be best achieved by modification of the M-1 rifle to provide for controllable full automatic fire and, in some cases, by the provision of greater magazine capacity.

This invention may be more particularly described as relating to the provision of a novel type of firing mechanism and to the modification of other parts of the U. S. rifle M-1 which will permit the delivery of full-automatic fire in a manner adequate to the realization of all the advantages of such fire. It is contemplated that a weapon of this kind should serve a highly useful purpose in the equipping of parachute troops and other airborne units.

Throughout the following specification the nomenclature applied to those elements common to or finding exact equivalents in the U. S. rifle M-1 will be that employed in War Department technical and training publications. The terms "forward," "right" and "left" may be referred to the position of a man standing at the breech end of the rifle and facing the muzzle.

The exact nature of the invention as well as other objects and advantages thereof will be understood from consideration of the specification referring to the accompanying drawings in which:

Figure 1 is a right side elevation showing the action assembled without the stock. The mechanism is in breech open position with the operating rod retained by engagement with the operating rod lock. The fire control is set in position to deliver a series of shots for each trigger actuation.

Figure 15 is a view similar to Figure 2, showing a U. S. rifle caliber .30 M-1 modified in accordance with this invention but without provision for increased magazine capacity.

Figure 17 is a partial left side elevational view showing a modified form of selector.

Figures 1, 8, 9, 18:
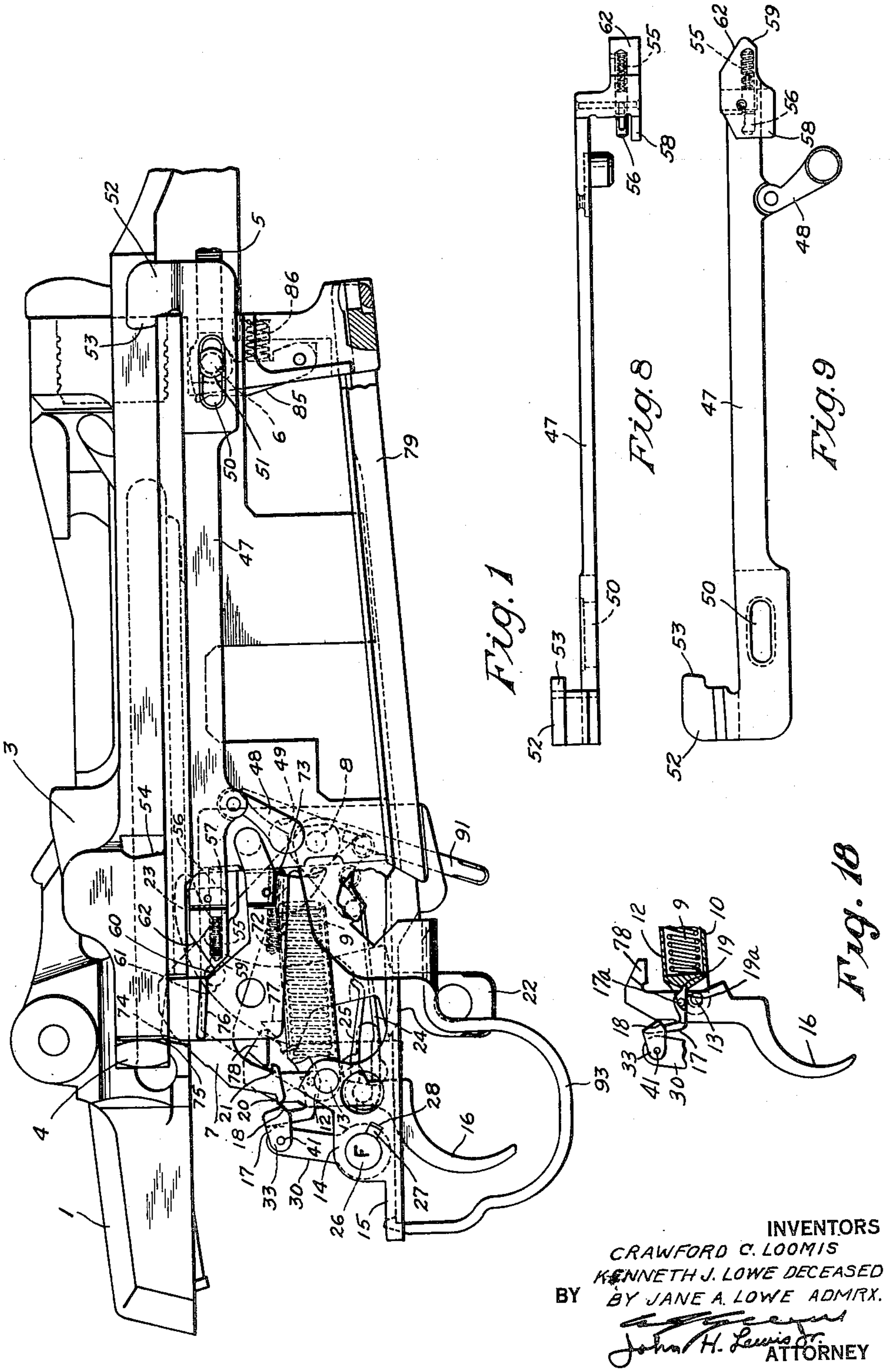
Figure 8 is a top plan view of the firing bar and link assembly.
Figure 9 is a left side elevational view of the firing bar and link assembly.
Figure 18 is a side elevational view, partially in section, of a portion of the trigger housing assembly showing in more detail the relationship of trigger, interrupter sear and hammer spring. The position of those parts shown is similar to that of Figure 1 except that the selector is set for semi-automatic fire.
Figures 2, 7:
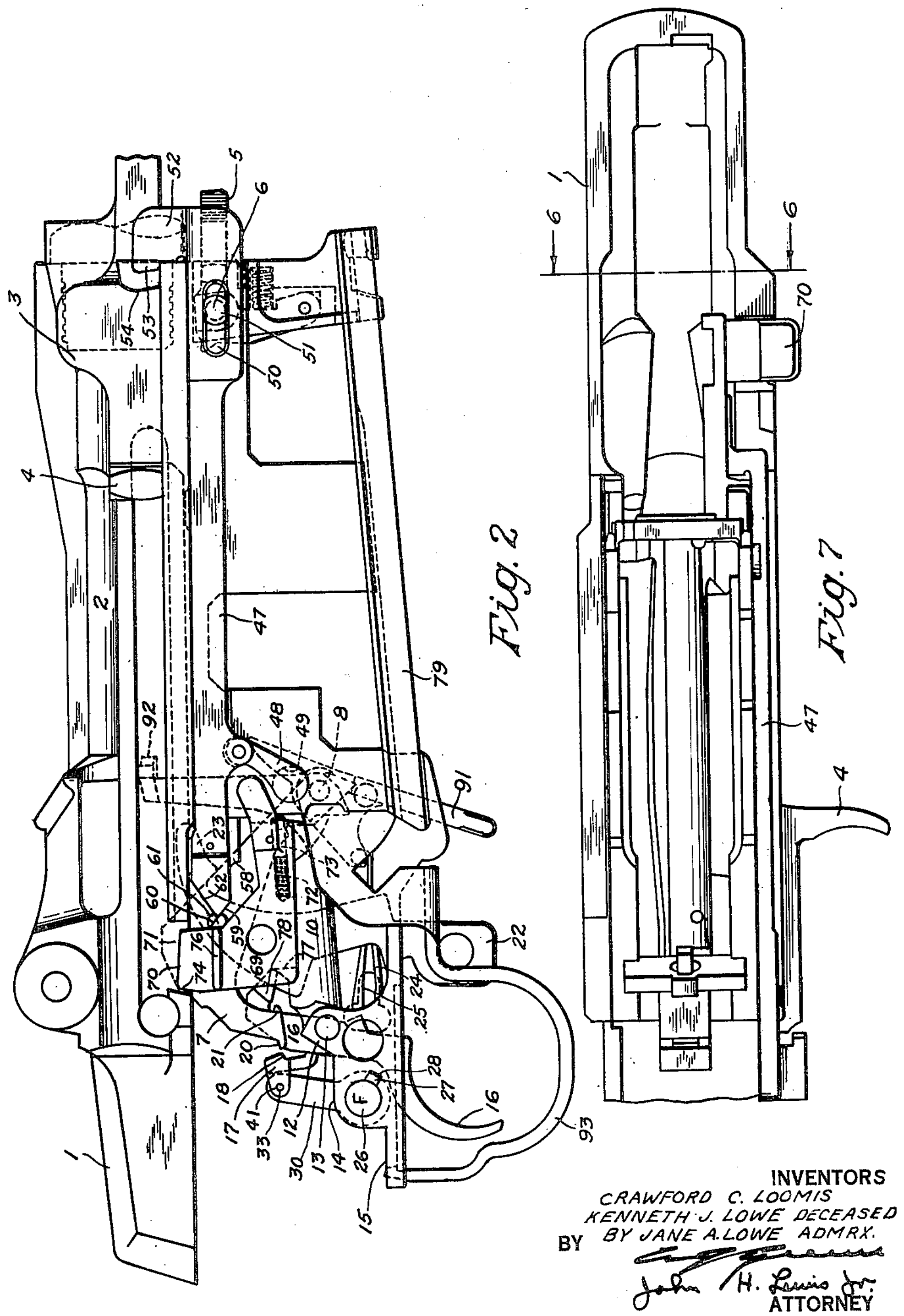
Figure 2 is a view similar to Figure 1, showing the mechanism in the position it would occupy just after the trigger has been pulled and just prior to release of the hammer. The breech mechanism is nearly closed.
Figure 7 is a bottom plan view of the receiver structure shown in Figure 5.

Referring to the drawings by characters of reference, it may be seen that the weapon comprises a receiver 1 which forms a housing for a bolt 2 slidably mounted thereon and actuated by gas pressure means through an operating rod 3. The operating rod is provided with cam surfaces engaging an operating lug on the bolt, and as the operating rod is driven rearwardly by gas pressure or moved rearwardly by manual effort exerted on the handle 4, the bolt is rotated to free its locking lugs from the receiver and then carried back by the operating rod. A spring, not shown, constantly urges the operating rod to a forward position and the rear end of the spring may conveniently bear on a follower rod 5 mounted on a transverse pin 6 extending through the receiver. The mechanism thus far described is, with the exception of the mounting for the rear end of the follower rod, substantially identical in construction and functioning with that of the M-1 rifle previously referred to and shown in the Garand patent. Detailed description is therefore believed to be unnecessary.

Figures 5, 6, 14:
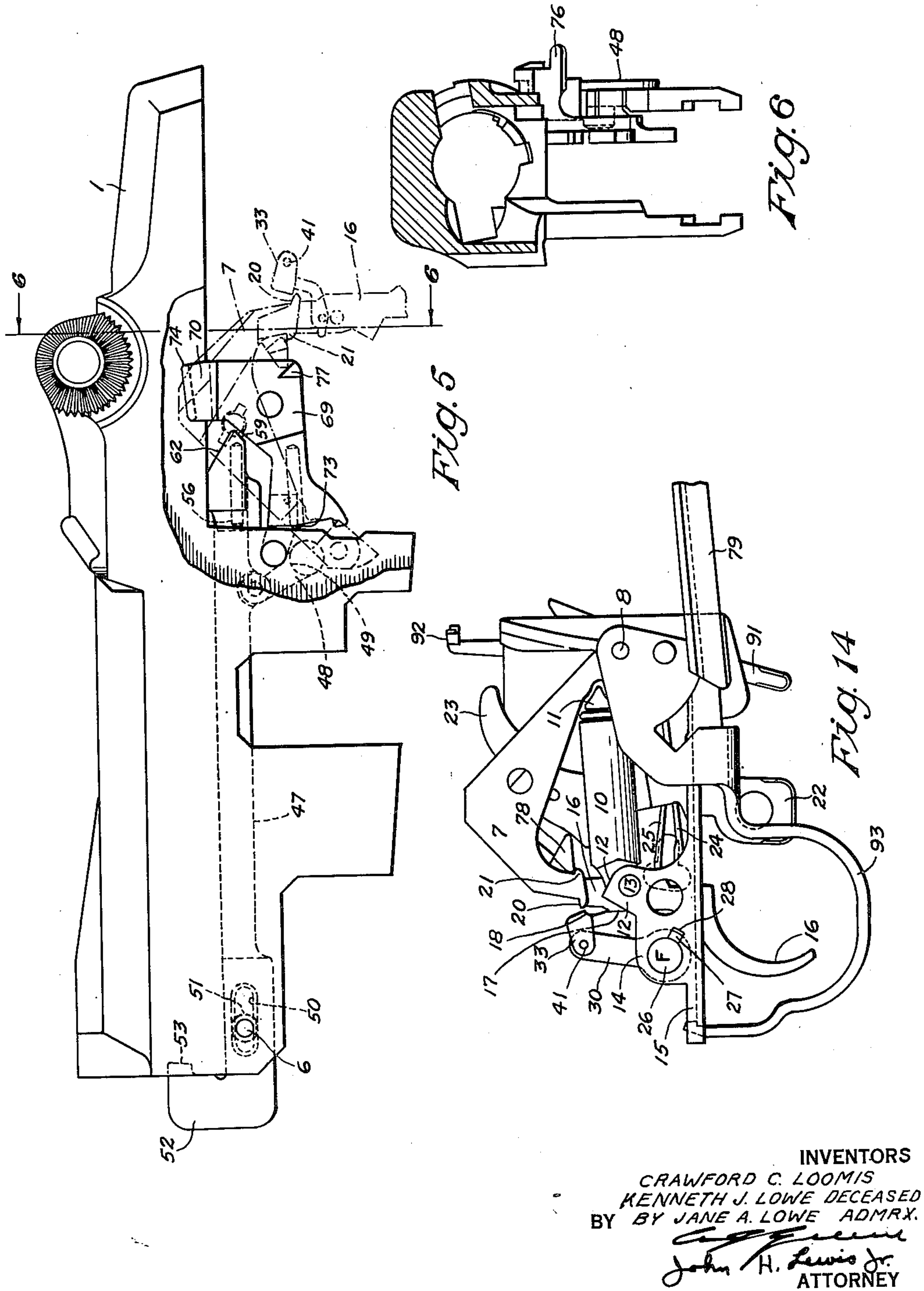
Figure 5 is a left side elevation of the receiver with part of the left side wall broken away to more clearly illustrate the inner surfaces of the firing bar and operating slide lock. The positions of the hammer, trigger, and auxiliary sear are shown in dotted lines.
Figure 6 is a vertical sectional view taken on the line 6—6 of Figure 5.
Figure 14 is a right side elevation of the trigger housing assembly removed from the receiver.

The trigger housing assembly shown separately in Figure 14 is generally similar to that of the M-1 rifle. It includes a hammer 7 mounted on a transverse pivot 8 and urged upwardly by a hammer spring 9 engaged between a hammer spring housing 10 and a hammer spring plunger 11. The plunger 11 bears directly on the hammer while the rear end of the housing 10 is provided with spaced apart ears 12 which loosely encircle the trigger pivot pin 13 which is supported in brackets 14 on the trigger housing 15. Pivotally hung on the pivot pin 13 is the trigger 16 and slightly above the trigger pivot 17*a* the interrupter sear 17 is pivotally mounted on the trigger. As shown in more detail in Figs. 16 through 20 of the Garand patent, above referred to, and in Figure 18 of this patent, a forwardly extending toe 19*a* on the interrupter sear bears on a perch 19 at the rear of the hammer spring housing in such a way that the thrust of the hammer spring is communicated to the trigger through the toe 19*a* and pivot 17*a*, tending to force the upper end of the trigger to the rear. Since the engagement of the hammer spring housing with the toe 19*a* is effectively below the center of pivotal mounting 17*a* of the interrupter sear 17, a moment is applied which tends to rotate the interrupter sear in such a way that its upper hammer hook engaging portion 18 is moved forwardly. The hammer 7 is provided at its end with rearwardly facing hooks 20 and with forwardly facing hooks 21. In the M-1 rifle it is the function of the rear hooks 20 to engage at 18 with the interrupter sear 17 whenever the hammer is cocked with the trigger held in firing position to prevent the firing of more than one shot. The forwardly facing hammer hooks engage with the trigger when it is in its normal position. A safety member 22 is pivotally mounted on the trigger housing and has a hook 23 which engages with the hammer to move it slightly rearward and there lock it when the safety is on. One end 24 of the spring 25 engages the safety to act as a detent therefor while the other end of the spring functions in a manner to be later described. The functioning of the firing mechanism thus far is substantially identical with that of the M-1 rifle and need not be further described.

This invention adds to the mechanism of the M-1 rifle a bolt controlled hammer holdback which has an important safety function and which operates as a fire control when it is desired to fire in full automatic fashion. This invention also adds to the M-1 rifle fire control a selector which permits the soldier to disable the auxiliary sear whenever it is desired to deliver automatic fire. These elements will now be described.

Rearward extensions on the trigger pivot support brackets 14 to receive a transversely slidable selector pin 26 which is prevented from turning therein by a key 27 received in a mating keyway 28 in the brackets. A portion of the lower surface of the selector is cut away at 29 and when this portion of the selector is aligned with the space between the brackets the selector link 30 which encircles this portion of the selector has freedom for limited movement. In the other position of the selector the link has a relatively snug fit on the selector body. A chamfered corner 31 on the link and a similar chamfer 32 on the selector insure that the selector may be moved into the movement limiting position without difficulty. The upper end of the selector link is pivotally engaged with a rearwardly extending arm 33 on the interrupter sear 17. In this way it will be seen that the interrupter sear will be retained in or slightly behind its normal trigger forward position whenever the selector is set for full automatic fire and will not be permitted, when the trigger is pulled, to move forward into position to engage the rear hammer hooks on recocking of the hammer. Thus, insofar as the trigger is concerned, the hammer will be free from restraint whenever the trigger is pulled with the selector set for full automatic fire. With the selector set for semi-automatic fire, the trigger and interrupter sear function as in the M-1 rifle.

The selector is releasably retained in either of its two positions and secured against inadvertent disassembly by a detent 34 urged by a spring 35 to slide in a bore 36 in the link into engagement with detent notches 37 and 38 in the selector. The slope of the barrier between the notches will permit the selector to be readily moved and retained in either position, while the square ends of the notches will prevent overtravel unless the detent is moved upwardly against the pressure of the spring. A slot 39 in the rear face of the link allows access for manually raising the detent to a position permitting the selector to be removed, if necessary. At its upper end, the spring 35 bears on a guide 40 backed up by the selector link pivot pin 41. The spring 35 thus performs a double function in that it operates on the detent notches and augments the force of the hammer spring in tending to pivot the auxiliary sear into hammer engaging position when released by the selector.

Figure 17 shows a modified form of selector which comprises a plate 42 pivotally mounted on the left outer side wall of the trigger housing 15. A selector handle 43 which may include a detent plunger pressing against the side wall of the trigger housing permits the plate to be rotated manually about its pivot. Above and to the rear of the selector pivot there is provided a selector finger 44 adapted to bear on a lug 45 formed integrally on an interrupter sear 46 which, except for the lug, is identical with that of the Garand patent. Obviously, when the selector is rotated to a position in which its handle is in its most forward position, the interrupter sear will have been cammed backward to a position in which it cannot engage the rear hammer hooks and the rifle will be capable of firing continuously when the trigger is held back. In a rearward position of the selector handle, the interrupter sear will function as in the M–1 rifle.

Figure 3:
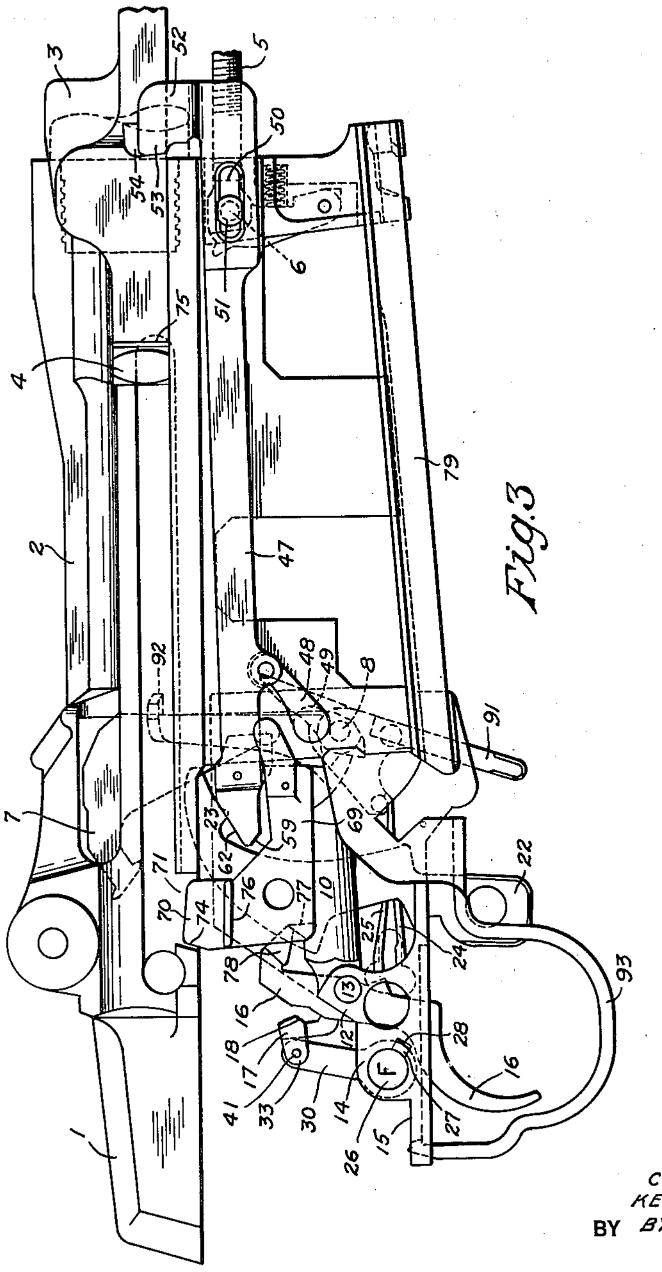
Figure 3 is a view similar to the two preceding figures, the mechanism being shown in the completely closed breech position which the parts would occupy when a round was being fired.

The other major addition to the mechanism of the M–1 rifle is the firing bar assembly which comprises the firing bar 47 pivotally engaged near its rear end with a firing bar link 48. The firing bar link is in turn trunnioned in a hole 49 originally provided in the receiver of the M–1 rifle to engage a locating pin in the manufacturing fixtures. The firing bar is provided near its forward end with a guide slot 50 received beneath a flanged head 51 on the operating spring follower rod pin 6. The extreme forward end of the firing bar is turned upwardly and outwardly at 52 and rearwardly to provide a shoulder 53 in line with an abutment 54 on the operating rod 3. It will be recalled that in the M–1 rifle the operating rod has a short length of forward movement after it has rotated the bolt into closed position before it comes to rest in its foremost position. The firing bar is so located with reference to the final position of the operating rod that the last portion of the overtravel of the operating rod is transmitted through the abutment 54 to the shoulder 53 on the firing bar. This movement of the forward end of the firing bar results in the rear end swinging forward and downward in a path determined by the link 48. Such movement is resisted by the spring 55 which, through the plunger 56, acts on the rear surface of the receiver at 57. The rear portion of the firing bar is also provided with a forwardly extending web 58 which bears against the inner wall of the receiver and serves to prevent outward displacement of the bar. The downwardly and rearwardly facing surface 59 on the firing bar is so positioned that when the firing bar 47 is urged fully to the rear by the spring 55 and the hammer is cocked it bears on the flat face 60 of a stud 61 secured in the side of the hammer. The upwardly and rearwardly facing surface 62 on the firing bar is so located that when the firing bar 47 is in its full rearward position and the hammer is in fired position, this surface 62 is in the path of movement of the stud 61 and it is engaged and cammed down by the stud 61 as the hammer is moved into cocked position by either manual or automatic rearward movement of the bolt. The spring immediately returns the firing bar to its rearward position shown in Figure 1, in which it holds the hammer cocked until the bar is drawn forward in the final movement of the operating rod as shown in Figure 3. The position of the hammer as held by the firing bar is such with relation to the trigger and auxiliary sear that either will be able to prevent hammer fall when the breech closes, unless they have been purposely prevented from so doing by adjustment of the selector or by pulling of the trigger. It will be seen that it is impossible to fire from an open bolt for the firing bar controls the release of the hammer and cannot release it prior to complete closure of the breech mechanism. In this way one of the fundamental safety requirements of any military weapon has been positively provided for as an incident to the provision of the firing bar for controlling full automatic fire.

Figures 10, 11, 12, 16:
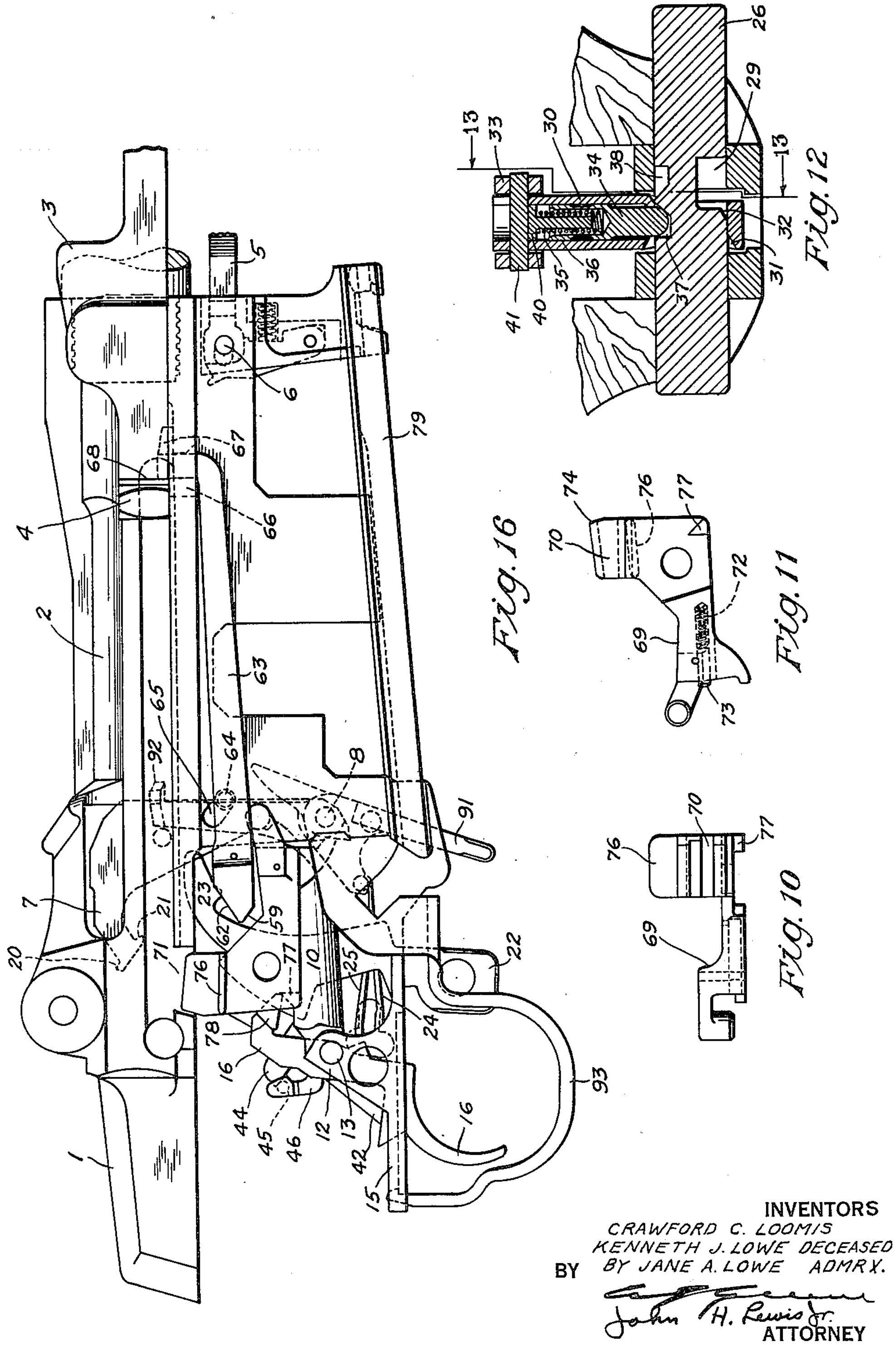
Figure 10 is a top plan view of the operating rod lock.
Figure 11 is a left side elevational view of the operating rod lock.
Figure 12 is a transverse sectional view through the selector taken on the line 12—12 shown in Figures 1, 2 and 3.
Figure 16 is a view similar to Figure 3, showing a modified type of firing bar.

Figure 16 shows an alernative form of firing bar 63 which is provided with an inwardly directed stud 64 received in an angling slot 65 formed in the side wall of the receiver. A slot 66 is cut through the lower wall of the operating rod handle guideway and a finger 67 on the firing bar extends through the slot in position to be engaged by an abutment 68 formed on the operating rod handle. The functioning of this form of firing bar is the same as that previously described, the angling guide slot 65 providing for the same downward and forward movement of the rear end of the firing bar as that guided by the link 48 on the other form.

An operating rod lock 69 shown in detail in Figures 10 and 11 is pivotally mounted on the right side of the receiver with its rear upper end 70 in position to swing through a cut 71 in the operating rod handle guide track. A spring 72 acting through a plunger 73 on the receiver yieldingly urges the rear end of the lock to its uppermost position in which the corner 74 engages a shoulder 75 formed on the lower face of the operating rod handle. A projecting finger piece 76 allows manual release of the operating rod and trigger actuated release is provided by means of an abutment 77 projecting inwardly from the lock and positioned to be engaged by a finger 78 on the trigger.

When the selector is set for full automatic fire, the rifle will continue to fire only so long as the trigger is held back. The chances that the soldier will release the trigger during the forward or the rearward movement of the operating rod are in accordance with the time consumed by such movement, which is somewhat greater for the forward movement. When the trigger is released during the rearward movement, the operating rod lock will be simultaneously released and the breech mechanism will remain in open position. The breech may be left in this condition, if desired, without impairing the soldier's ability to commence firing immediately, for the operation of the trigger under such conditions will first release the operating rod lock. The breech will close under the force of the operating spring and upon complete closing the hammer will be released by the firing bar. Should the rifle fail to stop in breech open condition with the chamber hot enough to cause danger of a "cookoff", or should it be desirable to have the action open to facilitate insertion of a magazine, the breech may be opened manually by the handle 4 and retained in engagement with the lock 69. At any time the finger piece 76 may be depressed and the spring will close the breech without firing, provided the trigger is not simultaneously depressed.

Figures 4, 13:
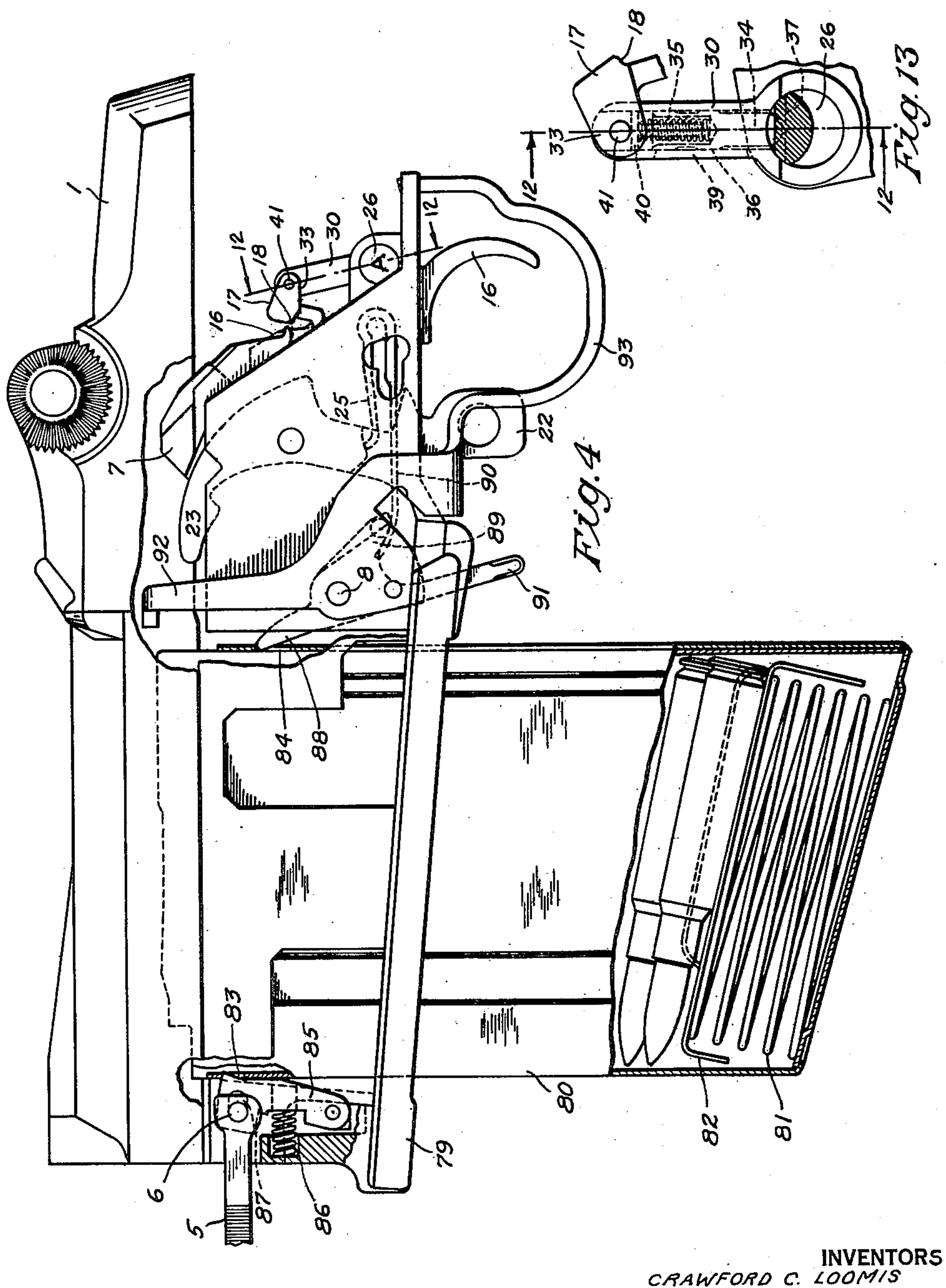
Figure 4 is a left side elevational view of the action assembled without the stock. A large capacity magazine is shown in place and parts have been broken away to show otherwise hidden components in greater detail.
Figure 13 is a longitudinal sectional view through the selector taken in a plane 13—13 of Figure 12 at right angles to Figure 12.

In adapting the rifle for use as a full automatic weapon, it is desirable to provide for increased magazine capacity. Accordingly, the magazine follower of the M-1 rifle has been omitted and the trigger housing floor plate 79 has been apertured to receive a box magazine 80 containing the conventional spring 81 and follower 82 as shown in Figure 4. The front and rear sidewalls of the magazine box are apertured respectively at 83 and 84 to engage with magazine latches. The front latch 85 is pivotally mounted in the receiver and is urged rearwardly by means of a spring 86, such movement, however, being limited by the fact that the elongated hole 87 surrounds the operating spring follower pin 6. It will be noted that the shape of the latch is such that on insertion of the magazine box it will be readily cammed forward and will positively snap back into the aperture 83. The rear magazine latch 88 is swingably received on the hammer pivot pin 8 and has a rearwardly extending arm 89 which engages the arm 90 of the spring 25. A finger piece 91 projecting below the floor plate permits the latch to be manually operated against the spring, thus positively removing the upper end from the aperture 84. When the rear wall of the magazine box has been thus released, the box may be swung forwardly about the front latch as a pivot until the tip of the front latch clears the aperture and allows complete removal of the magazine. On insertion, the box is simply pushed upwardly, camming both latches back and allowing them to seat firmly in the apertures.

The M-1 rifle is normally provided with a spring-urged plunger type ejector which is received in a bore in the bolt parallel to the firing pin bore. The M-1 rifle bolt face is also recessed to enclose the head of a cartridge, except for the extractor cutout. During full automatic fire, these features complicate the feeding problem and tend to cause an increase in extractor mortality. This is so because the recessed bolt face prevents feeding the cartridge from the magazine straight up the bolt face beneath the extractor claw and even if the wall of the recess were partly cut away, such a straight line feed would still not be possible because of the protruding ejector. Accordingly, it is desirable that at least a part of the wall defining the recess in the bolt face be cut away to permit the cartridge to come under the extractor claw. Similarly, it is desirable to provide an ejector which will not interfere with straightline feeding. Accordingly, the bolt has been modified to provide clearance and an arm 92 on the trigger guard 93 has been extended upward into position to intersect the path of rearward movement of a cartridge held by the extractor claw and eject it through the receiver port. The provision of the ejector does not interfere with the function of the trigger guard in regard to securing the trigger housing and receiver to each other which is disclosed in the Garand patent.

Figure 15 shows the basic M-1 rifle modified only by the provision of a firing bar 94 with its link 95 and a selector 96 which, through a link 97, controls the auxiliary sear 98 as previously described. A stud 99 in the side of the hammer engages the firing bar just as previously described. A rifle modified in this fashion will use the standard 8 round clip and although not equalling the rate of sustained fire achieved with magazines of larger capacity, will closely approach that rate by reason of the fact that the clip is automatically ejected when empty and a new one can be inserted with great facility.

Although certain more or less specific examples have been described herein, it is not intended that the scope of the invention be limited thereto. Accordingly, there are appended hereto claims which are intended to define the exact scope of the invention.

We claim:

1. In combination with an automatic firearm comprising a barrel chambered to receive a cartridge, a chamber closing breech mechanism comprising a reciprocating member, and a cartridge firing striker spring-urged to move from a cocked position to a fired position; fire control means comprising a firing bar, mounting means for the firing bar supporting same for combined slidable and swinging movement, means on the firing bar adapted for engagement with said striker to hold same in a cocked position, means on said firing bar arranged to be engaged by and slidably moved with said reciprocating member when said reciprocating member reaches a predetermined position, and guide means for said firing bar arranged to cause swinging movement thereof in response to any slidable movement whereby said firing bar is shifted by combined slidable and swinging movement to striker disengaging position.

2. In combination with an automatic firearm comprising a barrel chambered to receive a cartridge, a chamber closing breech mechanism comprising a reciprocating member, and a cartridge firing striker spring-urged to move from a cocked position to a fired position; fire control means comprising a firing bar, mounting means for the firing bar supporting one end thereof for engagement by and slidable movement with said reciprocating member when said member reaches a predetermined position, guide means for said firing bar causing swinging movement thereof in response to slidable movement with said member, and a lug on said firing bar engageable with said striker to hold same in a cocked position until the firing bar is moved by combined bodily and swinging movement induced by interengagement with said member.

3. In combination with an automatic firearm comprising a barrel chambered to receive a cartridge, a chamber closing breech mechanism comprising a reciprocating member, and a cartridge firing striker spring-urged to move from cocked position to fired position; fire control means comprising a firing bar, means at one end of said firing bar adapted for engagement and longitudinal movement by said reciprocating member when said reciprocating member reaches a predetermined position; mounting for said firing bar intermediate its ends enabling pivotal and longitudinal slidable movements thereof; guide means for the opposite end of the firing bar arranged to cause said bar to swingably move in response to any longitudinal sliding movement when said firing bar is engaged by said reciprocating member and thereby amplifying at said opposite end the movement imparted to said bar by said reciprocating member; means at said opposite end of said firing bar normally blocking movement of said striker and displaced by such amplified movement to enable movement of the striker; and spring means normally holding said firing bar in striker blocking position.

4. In combination with an automatic firearm comprising a barrel chambered to receive a cartridge, a chamber closing breech mechanism comprising a reciprocating member, and a cartridge firing striker spring-urged to move from cocked position to fired position; fire control means comprising a firing bar, means at one end of said firing bar adapted for engagement by and slidable movement with said reciprocating member when said reciprocating member reaches a predetermined position; mounting means for said firing bar providing a point adjacent said one end thereof relative to which said firing bar may have pivotal and slidable movement when said bar is engaged by the reciprocating member; guide means for the opposite end of the firing bar causing swinging movement of the bar about said point in response to slidable movement relative thereto; means at said opposite end of the firing bar normally blocking movement of the striker to a cocked position and displaced by combined swinging and slidable movement to release said striker for movement to fired position; and spring means normally holding said firing bar in striker blocking position.

5. In combination with an automatic firearm comprising a barrel chambered to receive a cartridge, a chamber closing breech mechanism comprising a reciprocating member, and a cartridge firing striker spring-urged to move from cocked position to fired position; fire control means comprising a firing bar, means at one end of said firing bar adapted for engagement by said reciprocating member when said reciprocating member reaches a predetermined position; mounting means for said firing bar providing a point adjacent said one end thereof relative to which said firing bar may have pivotal and slidable movement when said bar is engaged by the reciprocating member; guide means for the opposite end of the firing bar comprising a link pivotally connected at one end to the firing bar and fixed mounting means in which the other end of the link is trunnioned to cause swinging movement of the bar about said point in response to slidable movement relative thereto; means at said opposite end of the firing bar normally blocking movement of the striker to a cocked position and displaced by combined swinging and slidable movement to release said striker for movement to fired position; and spring means normally holding said firing bar in striker blocking position.

6. In combination with an automatic firearm comprising a barrel chambered to receive a cartridge, breech mechanism comprising a chamber closing breech bolt and a breech bolt operating slide having a forward movement independent of said breech bolt, a cartridge firing striker spring-urged to move from cocked position to fired position; a fire control means comprising a trigger; a primary sear operatively associated with said trigger and releasably engageable with the striker to retain same in cocked position; a secondary sear associated with said trigger and engageable with said striker, being arranged to normally engage and retain said striker when the striker is returned to cocked position before the primary sear has returned to striker engaging position; manually operable selector means arranged to selectively prevent said normal engagement of the secondary sear; and a firing bar having associated therewith a tertiary sear releasably engageable with said striker and adapted to hold said striker in cocked position, said bar being engaged and movable by said independent movement of said slide to release said striker from engagement with said tertiary sear.

7. In combination with an automatic firearm comprising a barrel chambered to receive a cartridge, a chamber closing breech mechanism comprising a breech bolt and a breech bolt reciprocating member having a forward movement independent of said bolt, and a cartridge firing striker spring-urged to move from cocked position to fired position; a fire control means comprising a trigger; a primary sear operatively controlled by said trigger and releasably engageable with the striker to retain same in a cocked position; a secondary sear associated with said trigger and engageable with said striker, being arranged to normally engage and retain said striker when the striker is returned to cocked position before the primary sear has returned to striker retaining position; manually operable selector means arranged to selectively prevent said normal engagement of the secondary sear; and a shiftable firing bar having associated therewith a tertiary sear releasably engageable with said striker and adapted to hold said striker in cocked position, and interengaging means on said reciprocating member and said firing bar respectively, whereby said firing bar is shifted to disengage said tertiary sear and release said striker when said reciprocating member reaches a predetermined position during said independent movement.

8. In an automatic firearm having a reciprocating element associated with the breech bolt and having a forward movement independent thereof and a spring-urged striker for firing a cartridge; fire control means comprising a trigger; a primary sear operatively controlled by said trigger and releasably engageable with the striker to retain same in a cocked position; a secondary sear associated with the trigger and arranged to normally engage and releasably retain the striker whenever the striker is returned to cocked position and the primary sear is not in position to retain the striker; manually operable selector means to selectively prevent said normal engagement of the secondary sear; a firing bar, a tertiary sear member at one end of the firing bar engageable with said striker to hold same in a retracted position, a projection at the other end of the firing bar in the path of movement of said reciprocating element and engaged thereby when said element reaches a predetermined position in its independent motion for movement therewith, and guide means for the firing bar causing said tertiary sear member to move to a striker releasing position during the movement of the firing bar with said element.

9. In combination with an automatic firearm comprising a barrel chambered to receive a cartridge, breech mechanism comprising a chamber closing breech bolt and a breech bolt operating slide having a forward movement independent of said breech bolt, a cartridge firing striker spring-urged to move from cocked position to fired position, and a depressible trigger having associated therewith a primary sear engageable with the striker to hold same in a cocked position; supplemental fire control means comprising a secondary interrupter sear associated with said trigger and spring-urged to engage and retain the striker in cocked position when the trigger is depressed, a selector operable to releasably prevent movement of the interrupter sear in a striker engaging direction, and a firing bar having a tertiary sear engageable with said striker and adapted to hold the striker in cocked position, said bar being engaged and movable by the bolt operating slide during independent movement thereof to release said tertiary sear from engagement with said striker.

10. In combination with an automatic firearm comprising a barrel chambered to receive a cartridge, breech mechanism comprising a chamber closing breech bolt and a breech bolt operating slide having a forward movement independent of said breech bolt, a cartridge firing striker spring-urged to move from cocked position to fired position, and a depressible trigger having associated therewith a primary sear engageable with the striker to hold same in a cocked position; supplemental fire control means comprising a secondary interrupter sear associated with said trigger and spring-urged to engage said striker and retain same in a cocked position when it has been recocked prior to release of the trigger following depression thereof, a selector including an element movable into position to prevent engagement of the striker by the secondary interrupter sear, a firing bar, mounting means for the firing bar supporting same for combined bodily and swinging movement, tertiary sear means on the firing bar adapted for engagement with the striker to hold same in a cocked position, resilient means urging the firing bar toward striker holding position, and interengaging means on said firing bar and said operating slide for movement of said bar to striker disengaging position by combined rocking and bodily movement during said forward independent movement of said slide.

11. In an automatic firearm having a cartridge firing striker, a trigger, and an interrupter sear associated with the trigger and spring-urged to engage and interrupt the action of the striker after each cartridge has been fired until the trigger has been released; selector means to condition the rifle for semi-automatic or continuous firing comprising a link pivotally engaged with the interrupter sear, an eye on said link, and a manually actuable cross bolt slidably mounted to pass through said eye, said cross bolt providing two zones alternatively positionable within said eye, one zone being adapted to prevent substantial movement of said link and the other zone being relieved to an extent permitting movement of the link sufficient for striker engagement by the interrupter sear.

12. An automatic and semi-automatic firearm, including in combination: a receiver; a unit comprising a breech-bolt movable in the said receiver and a bolt-operating member mounted for movement adjacent the said receiver and operatively connected to the said breech-bolt for moving the same; a spring-pressed firing-member provided with a primary cocking-abutment, a secondary cocking-abutment and a tertiary cocking-abutment; a trigger; a primary sear operatively associated with the said trigger for being moved thereby and having a primary cocking-abutment releasably engageable with the primary cocking-abutment of the said firing-member when the said trigger is released; a secondary sear having a secondary cocking-abutment normally releasably engageable with the secondary cocking-abutment of the said firing-member when the said trigger is pulled and movable with respect to the said trigger for being held in a retired position; a tertiary sear having a tertiary cocking-abutment releasably engageable with the tertiary cocking-abutment of the said firing-member; manually-operable control-means engageable with the said secondary sear for releasably holding the same in a retired position; means operatively connecting the said secondary sear to the said trigger to effect the movement of the former by the latter, the said means including a spring yieldingly urging the secondary cocking-abutment of the said secondary sear into position for releasable engagement with the secondary cocking-abutment of the said firing-member and permitting the relative movement of the secondary sear in the opposite direction; and means actuated by the said unit to retire the said tertiary sear as the said breech-bolt moves into its breech-closing position.

13. An automatic and semi-automatic firearm, including in combination: a receiver; a breech-bolt movable in the said receiver; a bolt-operating member mounted for movement adjacent the said receiver and operatively connected to the said breech-bolt for moving the same; a spring-pressed firing-member provided with a primary cocking-abutment, a secondary cocking-abutment and a tertiary cocking-abutment; a trigger; a primary sear operatively associated with the said trigger for being moved thereby and having a primary cocking-abutment releasably engageable with the primary cocking-abutment of the said firing-member when the said trigger is released; a secondary sear having a secondary cocking-abutment normally releasably engageable with the secondary cocking-abutment of the said firing-member when the said trigger is pulled and movable with respect to the said trigger for being held in a retired position; a tertiary sear having a tertiary cocking-abutment releasably engageable with the tertiary cocking-abutment of the said firing-member; manually-operable control-means engageable with the said secondary sear for releasably holding the same in a retired position; means operatively connecting the said secondary sear to the said trigger to effect the movement of the former by the latter, the said means including a spring yieldingly urging the secondary cocking-abutment of the said secondary sear into position for releasable engagement with the secondary cocking-abutment of the said firing-member and permitting the relative movement of the secondary sear in the opposite direction; and means carried by the said bolt-operating member to retire the said tertiary sear as the said breech-bolt moves into its breech-closing position.

14. An automatic and semi-automatic firearm, including in combination: a receiver; a unit comprising a breech-bolt movable in the said receiver and a bolt-operating member mounted for movement adjacent the said receiver and operatively connected to the said breech-bolt for moving the same; a spring-pressed firing-member provided with a primary cocking-abutment, a secondary cocking-abutment and a tertiary cocking-abutment; a trigger; a primary sear operatively associated with the said trigger for being moved thereby and having a primary cocking-abutment releasably engageable with the primary cocking-abutment of the said firing-member when the said trigger is released; a secondary sear having a secondary cocking-abutment normally releasably engageable with the secondary cocking-abutment of the said firing-member when the said trigger is pulled and movable with respect to the said trigger for being held in a retired position; a tertiary sear having a tripping-abutment and a tertiary cocking-abutment releasably engageable with the tertiary cocking-abutment of the said firing-member; manually-operable control-means engageable with the said secondary sear for releasably holding the same in a retired position;

means operatively connecting the said secondary sear to the said trigger to effect the movement of the former by the latter, the said means including a spring yieldingly urging the secondary cocking-abutment of the said secondary sear into position for releasable engagement with the secondary cocking-abutment of the said firing-member and permitting the relative movement of the secondary sear in the opposite direction; and a tripping-abutment carried by the said unit and engageable with the tripping-abutment of the said tertiary sear as the said breech-bolt moves into its breech-closing position to retire the said tertiary sear.

15. An automatic and semi-automatic firearm, including in combination: a receiver; a breech-bolt movable in the said receiver; a bolt-operating member mounted for movement adjacent the said receiver and operatively connected to the said breech-bolt for moving the same; a spring-pressed firing-member provided with a primary cocking-abutment, a secondary cocking-abutment and a tertiary cocking-abutment; a trigger; a primary sear operatively associated with the said trigger for being moved thereby and having a primary cocking-abutment releasably engageable with the primary cocking-abutment of the said firing-member when the said trigger is released; a secondary sear having a secondary cocking-abutment normally releasably engageable with the secondary cocking-abutment of the said firing-member when the said trigger is pulled and movable with respect to the said trigger for being held in a retired position; a tertiary sear having a tripping-abutment and a tertiary cocking-abutment releasably engageable with the tertiary cocking-abutment of the said firing-member; manually-operable control-means engageable with the said secondary sear for releasably holding the same in a retired position; means operatively connecting the said secondary sear to the said trigger to effect the movement of the former by the latter, the said means including a spring yieldingly urging the secondary cocking-abutment of the said secondary sear into position for releasable engagement with the secondary cocking-abutment of the said firing-member and permitting the relative movement of the secondary sear in the opposite direction; and a tripping-abutment carried by the said bolt-operating member and engageable with the tripping-abutment of the said tertiary sear as the said breech-bolt moves into its breech-closing position to retire the said tertiary sear.

16. An automatic and semi-automatic firearm, including in combination: a receiver; a unit comprising a breech-bolt movable in the said receiver and a bolt-operating member mounted for movement adjacent the said receiver and operatively connected to the said breech-bolt for moving the same; a spring-pressed firing-member provided with a primary cocking-abutment, a secondary cocking-abutment and a tertiary cocking-abutment; a trigger; a primary sear rigid with the said trigger for movement therewith and having a primary cocking-abutment releasably engageable with the primary cocking-abutment of the said firing-member when the said trigger is released; a secondary sear yieldingly carried by the said trigger and having a secondary cocking-abutment normally releasably engageable with the secondary cocking-abutment of the said firing-member when the said trigger is pulled and movable with respect to the said trigger for being held in a retired position; a tertiary sear having a tertiary cocking-abutment releasably engageable with the tertiary cocking-abutment of the said firing-member; manually-operable control-means engageable with the said secondary sear for releasably holding the same in a retired position; means operatively connecting the said secondary sear to the said trigger to effect the movement of the former by the latter, the said means including a spring yieldingly urging the secondary cocking-abutment of the said secondary sear into position for releasable engagement with the secondary cocking-abutment of the said firing-member and permitting the relative movement of the secondary sear in the opposite direction; and means actuated by the said unit to retire the said tertiary sear as the said breech-bolt moves into its breech-closing position.

17. An automatic and semi-automatic firearm, including in combination: a receiver; a breech-bolt movable in the said receiver; a bolt-operating member mounted for movement adjacent the said receiver and operatively connected to the said breech-bolt for moving the same; a spring-pressed firing-member provided with a primary cocking-abutment, a secondary cocking-abutment and a tertiary cocking-abutment; a trigger; a primary sear rigid with the said trigger for movement therewith and having a primary cocking-abutment releasably engageable with the primary cocking-abutment of the said firing-member when the said trigger is released; a secondary sear yieldingly carried by the said trigger and having a secondary cocking-abutment normally releasably engageable with the secondary cocking-abutment of the said firing member when the said trigger is pulled and movable with respect to the said trigger for being held in a retired position; a tertiary sear having a tertiary cocking-abutment releasably engageable with the tertiary cocking-abutment of the said firing-member; manually-operable control-means engageable with the said secondary sear for releasably holding the same in a retired position; means operatively connecting the said secondary sear to the said trigger to effect the movement of the former by the latter, the said means including a spring yieldingly urging the secondary cocking-abutment of the said secondary sear into position for releasable engagement with the secondary cocking-abutment of the said firing-member and permitting the relative movement of the secondary sear in the opposite direction; and means carried by the said bolt-operating member to retire the said tertiary sear as the said breech-bolt moves into its breech-closing position.

18. An automatic and semi-automatic firearm, including in combination: a receiver; a unit comprising a breech-bolt movable in the said receiver and a bolt-operating member mounted for movement adjacent the said receiver and operatively connected to the said breech-bolt for moving the same; a spring-pressed firing-member provided with a primary cocking-abutment, a secondary cocking-abutment and a tertiary cocking-abutment; a trigger; a primary sear rigid with the said trigger for movement therewith and having a primary cocking-abutment releasably engageable with the primary cocking-abutment of the said firing-member when the said trigger is released; a secondary sear yieldingly carried by the said trigger and having a secondary cocking-abutment normally releasably engageable with the secondary cocking-abutment of the said firing-member when the said trigger is pulled and movable with respect to the said trigger for being held in a retired position; a tertiary sear having a tripping-abutment and a tertiary cocking-abutment releasably engageable with the tertiary cocking-abutment of the said firing-member; manually-operable control-means engageable with the said secondary sear for releasably holding the same in a retired position; means operatively connecting the said secondary sear to the said trigger to effect the movement of the former by the latter, the said means including a spring yieldingly urging the secondary cocking-abutment of the said secondary sear into position for releasable engagement with the secondary cocking-abutment of the said firing-member and permitting the relative movement of the secondary sear in the opposite direction; and a tripping-abutment carried by the said unit and engageable with the tripping-abutment of the said tertiary sear as the said breech-bolt moves into its breech-closing position to retire the said tertiary sear.

19. An automatic and semi-automatic firearm, including in combination: a receiver; a breech-bolt movable in the said receiver; a bolt-operating member mounted for movement adjacent the said receiver and operatively connected to the said breech-bolt for moving the same; a spring-pressed firing-member provided with a primary cocking-abutment, a secondary cocking-abutment and a tertiary cocking-abutment; a trigger; a primary sear rigid with the said trigger for movement therewith and having a primary cocking-abutment releasably engageable with the primary cocking-abutment of the said firing-member when the said trigger is released; a secondary sear yieldingly carried by the said trigger and having a secondary cocking-abutment normally releasably engageable with the secondary cocking-abutment of the said firing-member when the said trigger is pulled and movable with respect to the said trigger for being held in a retired position; a tertiary sear having a tripping-abutment and a tertiary cocking-abutment releasably engageable with the tertiary cocking-abutment of the said firing-member; manually-operable control-means engageable with the said secondary sear for releasably holding the same in a retired position; means operatively connecting the said secondary sear to the said trigger to effect the movement of the former by the latter, the said means including a spring yieldingly urging the secondary cocking-abutment of the said secondary sear into position for releasable engagement with the secondary cocking-abutment of the said firing-member and permitting the relative movement of the secondary sear in the opposite direction; and a tripping-abutment carried by the said bolt-operating member and engageable with the tripping-abutment of the said tertiary sear as the said breech-bolt moves into its breech-closing position to retire the said tertiary sear.

20. An automatic and semi-automatic firearm, including in combination: a receiver; a unit comprising a breech-bolt movable in the said receiver and a reciprocating bolt-operating slide mounted for reciprocation adjacent the said receiver and operatively connected to the said breech-bolt for moving the same; a spring-pressed firing-member provided with a primary cocking-abutment, a secondary cocking-abutment and a tertiary cocking-abutment; a trigger; a primary sear operatively associated with the said trigger for being moved thereby and having a primary cocking-abutment releasably engageable with the primary cocking-abutment of the said firing-member when the said trigger is released; a pivotal secondary sear having a secondary cocking-abutment normally releasably engageable with the secondary cocking-abutment of the said firing-member when the said trigger is pulled and movable with respect to the said trigger for being held in a retired position; a reciprocating tertiary sear having a tertiary cocking-abutment releasably engageable with the tertiary cocking-abutment of the said firing-member; manually-operable control-means engageable with the said secondary sear for releasably holding the same in a retired position; means operatively connecting the said secondary sear to the said trigger to effect the movement of the former by the latter, the said means including a spring yieldingly urging the secondary cocking-abutment of the said secondary sear into position for releasable engagement with the secondary cocking-abutment of the said firing-member and permitting the relative movement of the secondary sear in the opposite direction; and means actuated by the said unit to retire the said tertiary sear as the said breech-bolt moves into its breech-closing position.

21. An automatic and semi-automatic firearm, including in combination: a receiver; a breech-bolt movable in the said receiver; a reciprocating bolt-operating slide mounted for reciprocation adjacent the said receiver and operatively connected to the said breech-bolt for moving the same; a spring-pressed firing-member provided with a primary cocking-abutment, a secondary cocking-abutment and a tertiary cocking-abutment; a trigger; a primary sear operatively associated with the said trigger for being moved thereby and having primary cocking-abutment releasably engageable with the primary cocking-abutment of the said firing-member when the said trigger is released; a pivotal secondary sear having a secondary cocking-abutment normally releasably engageable with the secondary cocking-abutment of the said firing-member when the said trigger is pulled and movable with respect to the said trigger for being held in a retired position; a reciprocating tertiary sear having a tertiary cocking-abutment releasably engageable with the tertiary cocking-abutment of the said firing-member; manually-operable control-means engageable with the said secondary sear for realeasably holding the same in a retired position; means operatively connecting the said secondary sear to the said trigger to effect the movement of the former by the latter, the said means including a spring yieldingly urging the secondary cocking-abutment of the said secondary sear into position for releasable engagement with the secondary cocking-abutment of the said firing-member and permitting the relative movement of the secondary sear in the opposite direction; and means carried by the said bolt-operating slide to retire the said tertiary sear as the said breech-bolt moves into its breech-closing position.

22. An automatic and semi-automatic firearm, including in combination: a receiver; a unit comprising a breech-bolt movable in the said receiver and a reciprocating bolt-operating slide mounted for reciprocation adjacent the said receiver and operatively connected to the said breech-bolt for moving the same; a spring-pressed firing-member provided with a primary cocking-abutment, a secondary cocking abutment and a tertiary cocking-abutment; a trigger; a primary sear rigid with the said trigger for movement therewith and having a primary cocking-abutment releasably engageable with the primary cocking-abutment of said firing-member when the said trigger is released; a pivotal secondary sear yieldingly carried by the said trigger and having a secondary cocking-abutment normally releasably enagageable with the secondary cocking-abutment of the said firing-member when the said trigger is pulled and movable with respect to the said trigger for being held in a retired position; a reciprocating tertiary sear having a rearwardly-facing tripping-abutment and a tertiary cocking-abutment releasably engageable with the tertiary cocking-abutment of the said firing-member; manually-operable control-means engageable with the said secondary sear for releasably holding the same in a retired position; means operatively connecting the said secondary sear to the said trigger to effect the movement of the former by the latter, the said means including a spring yieldingly urging the secondary cocking-abutment of the said secondary sear into position for releasable engagement with the secondary cocking-abutment of the said firing-member and permitting the relative movement of the secondary sear in the opposite direction; and a forwardly-facing tripping-abutment carried by the said unit and engageable with the rearwardly-facing tripping-abutment of the said tertiary sear as the said breech-bolt moves into its breech-closing position to retire the said tertiary sear.

23. An automatic and semi-automatic firearm, including in combination: a receiver; a breech-bolt movable in the said receiver; a reciprocating bolt-operating slide mounted for reciprocation adjacent the said receiver and operatively connected to the said breech-bolt for moving the same; a spring-pressed firing-member provided with a primary cocking-abutment, a secondary cocking-abutment and a tertiary cocking-abutment; a trigger; a primary sear rigid with the said trigger for movement therewith and having a primary cocking-abutment releasably engageable with the primary cocking-abutment of the said firing-member when the said trigger is released; a pivotal secondary sear yieldingly carried by the said trigger and having a secondary cocking-abutment normally releasably engageable with the secondary cocking-abutment of the said firing-member when the said trigger is pulled and movable with respect to the said trigger for being held in a retired position; a reciprocating tertiary sear having a rearwardly-facing tripping-abutment and a tertiary cocking-abutment releasably engageable with the tertiary cocking-abutment of the said firing-member; manually-operable control-means engageable with the said secondary sear for releasably holding the same in a retired position; means operatively connecting the said secondary sear to the said trigger to effect the movement of the former by the latter, the said means including a spring yieldingly urging the secondary cocking-abutment of the said secondary sear into position for releasable engagement with the secondary cocking-abutment of the said firing-member and permitting the relative movement of the secondary sear in the opposite direction; and a forwardly-facing tripping-abutment carried by the said bolt-operating slide and engageable with the rearwardly-facing tripping-abutment of the said tertiary sear as the said breech-bolt moves into its breech-closing position to retire the said tertiary sear.

CRAWFORD C. LOOMIS.
JANE A. LOWE,
*Administratrix of the Estate of Kenneth J. Lowe, Deceased.*

REFERENCES CITED

The following references are of record in the file of this patent:

UNITED STATES PATENTS

| Number | Name | Date |
|---|---|---|
| 1,100,054 | Castle | June 16, 1914 |
| 1,103,228 | Swebilius et al. | July 14, 1914 |
| 1,441,807 | Horan | Jan. 9, 1923 |
| 1,557,627 | Swebilius | Oct. 20, 1925 |
| 2,068,289 | Gurney | Jan. 19, 1937 |
| 2,135,005 | Hoagland et al. | Nov. 1, 1938 |
| 2,308,598 | Ferrel | Jan. 19, 1943 |
| 2,324,125 | Van Horn et al. | July 13, 1943 |
| 2,367,280 | Hyde | Jan. 16, 1945 |
| 2,383,487 | Johnson | Aug. 28, 1945 |
| 2,399,253 | Reilly | Apr. 30, 1946 |
| 2,452,617 | Wechsler | Nov. 21, 1948 |
| 2,465,487 | Sampson | Mar. 29, 1949 |
| 2,469,053 | Roemer | May 3, 1949 |
| 2,479,419 | Sefried | Aug. 16, 1949 |